(12) United States Patent
Tassitino, Jr. et al.

(10) Patent No.: US 7,400,066 B2
(45) Date of Patent: Jul. 15, 2008

(54) APPARATUS AND METHODS FOR UPS BYPASS MONITORING AND CONTROL

(75) Inventors: Frederick Tassitino, Jr., Wake Forest, NC (US); Jason Anderson, Raleigh, NC (US); Michael Westerfield, Durham, NC (US)

(73) Assignee: Eaton Corporation, Cleveland, OH (US)

( * ) Notice: Subject to any disclaimer, the term of this patent is extended or adjusted under 35 U.S.C. 154(b) by 407 days.

(21) Appl. No.: 10/874,713

(22) Filed: Jun. 23, 2004

(65) Prior Publication Data

US 2005/0288826 A1    Dec. 29, 2005

(51) Int. Cl.
*H02J 1/12* (2006.01)
(52) U.S. Cl. .......................................... 307/46; 361/78
(58) Field of Classification Search ............... 307/52, 307/53, 59, 64, 65, 44, 46; 700/286; 361/78
See application file for complete search history.

(56) References Cited

U.S. PATENT DOCUMENTS

| | | | | |
|---|---|---|---|---|
| 6,191,500 | B1 * | 2/2001 | Toy | 307/64 |
| 6,201,319 | B1 * | 3/2001 | Simonelli et al. | 307/26 |
| 2002/0043859 | A1 * | 4/2002 | Smith | 297/392 |
| 2005/0036253 | A1 * | 2/2005 | Tian et al. | 361/66 |
| 2005/0043859 | A1 * | 2/2005 | Tsai et al. | 700/286 |

* cited by examiner

*Primary Examiner*—Michael J Sherry
*Assistant Examiner*—Daniel Cavallari
(74) *Attorney, Agent, or Firm*—Myers Bigel Sibley & Sajovec

(57) ABSTRACT

Status of a bypass source of parallel-connected UPSs is determined from a load share when a loading of the parallel-connected UPSs meets a predetermined criterion. Status of a bypass source of the parallel-connected UPSs is determined from a bypass source voltage when the loading of the parallel-connected UPSs fails to meet the predetermined criterion. The loading may include an aggregate loading, and failure of a bypass source of a UPS may be identified responsive to detecting that a load share of the UPS is less than a predetermined proportion of the aggregate loading. Alternatively, failure of the bypass source may be identified by detecting that a bypass voltage fails to meet a predetermined criterion. Bypass circuits of the UPSs may be controlled responsive to a load share and/or a bypass source voltage.

18 Claims, 5 Drawing Sheets

APPARATUS AND METHODS FOR UPS BYPASS MONITORING AND CONTROL

BACKGROUND OF THE INVENTION

The invention relates to power conversion apparatus and methods, and more particularly, to uninterruptible power supply (UPS) apparatus and methods.

A typical conventional "on-line" UPS may include an AC/DC converter (e.g., a rectifier) that is configured to be coupled to an AC power source, such as a utility source, and a DC/AC converter (e.g., an inverter) that is coupled to the AC/DC converter by a DC link and which produces an AC voltage at an output (load) bus of the UPS. The UPS may further include a bypass circuit, e.g., a static switch, which can be used to couple the AC power source directly to the output bus of the UPS, such that the AC/DC converter and DC/AC converter are bypassed. The bypass circuit can be used, for example, to provide an economy mode of operation and/or to provide power to the load when either or both of the converters are damaged or inoperative.

Bypass circuits can create dangerous conditions in applications in which multiple UPSs are feeding a common load bus in parallel. In particular, a bypass source to a UPS in such a parallel-connected configuration may be absent due to, for example, tripping of a breaker or opening of a switch in the bypass source path. However, if the bypass circuit of the UPS is closed, voltage may be backfed from the common load bus through the closed bypass circuit. Accordingly, monitoring the voltage at an input of the bypass circuit may not reveal the absence of the bypass source, as the backfed voltage may provide an appearance that the bypass source is present. Underwriters Laboratories, Inc. (UL®) views such a state as a potential hazard, and has promulgated standards that require that such a condition be detected and avoided.

SUMMARY OF THE INVENTION

In some embodiments of the invention, a power conversion apparatus including a plurality of parallel-connected uninterruptible power supplies is monitored and/or controlled. A status of a bypass source of the plurality of parallel-connected UPSs is determined from a load share when a loading of the plurality of parallel-connected UPSs meets a predetermined criterion. A status of the bypass source is determined from a bypass source voltage when the loading of the plurality of parallel-connected UPSs fails to meet the predetermined criterion. The loading may include an aggregate loading, and failure of a bypass source of a UPS may be identified responsive to detecting that a load share of the UPS is less than a predetermined proportion of the aggregate loading. Determining a status of the bypass source from a bypass source voltage when the loading of the plurality of parallel-connected UPSs fails to meet the predetermined criterion may include decoupling a bypass source of a UPS from an output of the UPS, determining a bypass source voltage of the decoupled bypass source, and identifying failure of the bypass source responsive to detecting that the determined bypass voltage fails to meet a predetermined criterion. Bypass circuits of the UPSs may be controlled responsive to load share and/or bypass source voltage.

In further embodiments of the invention, an aggregate loading of a plurality of parallel-connected UPSs is determined. One of a load share provided by a first UPS of the plurality of parallel-connected UPSs or a bypass source voltage for the first UPS is selectively determined responsive to the determined aggregate loading. A bypass circuit of the first UPS is controlled responsive to the selectively determined load share or bypass source voltage.

According to additional embodiments of the invention, a power conversion apparatus includes a plurality of UPSs connected in parallel at a load bus. The apparatus further includes a control circuit operative to determine an aggregate loading of the parallel-connected UPSs at the load bus, to selectively determine one of a load share provided by a first UPS of the plurality of parallel-connected UPSs or a bypass source voltage for the first UPS responsive to the determined aggregate loading, and to control a bypass circuit of the first UPS responsive to the selectively determined load share or bypass source voltage.

In other embodiments of the invention, a power conversion apparatus includes a plurality of parallel-connected UPSs and a control circuit operative to determine a status of a bypass source of the plurality of parallel-connected UPSs from a load share when a loading of the plurality of parallel-connected UPSs meets a predetermined criterion and to determine a status of a bypass source from a bypass source voltage when the loading of the plurality of parallel-connected UPSs fails to meet the predetermined criterion. In some embodiments, the control circuit includes respective control circuits positioned in respective ones of the UPSs. The plurality of control circuits may include at least one master control circuit and at least one slave control circuit. In further embodiments, the plurality of control circuits includes a plurality of peer control circuits.

In still further embodiments of the invention, a UPS includes a power conversion circuit operative to transfer power to a load bus, a bypass circuit operative to couple and decouple a bypass source to and from the load bus, and a communications circuit operative to communicate with at least one other UPS. The UPS further includes a control circuit operatively associated with the communications circuit and the bypass circuit and operative to determine a loading of the UPS, to selectively determine a load share of the UPS or a bypass source voltage of the bypass source responsive to the determined aggregate loading, and to control the bypass circuit responsive to the selectively determined load share or bypass source voltage.

DETAILED DESCRIPTION OF EXEMPLARY EMBODIMENTS

Figure 1:
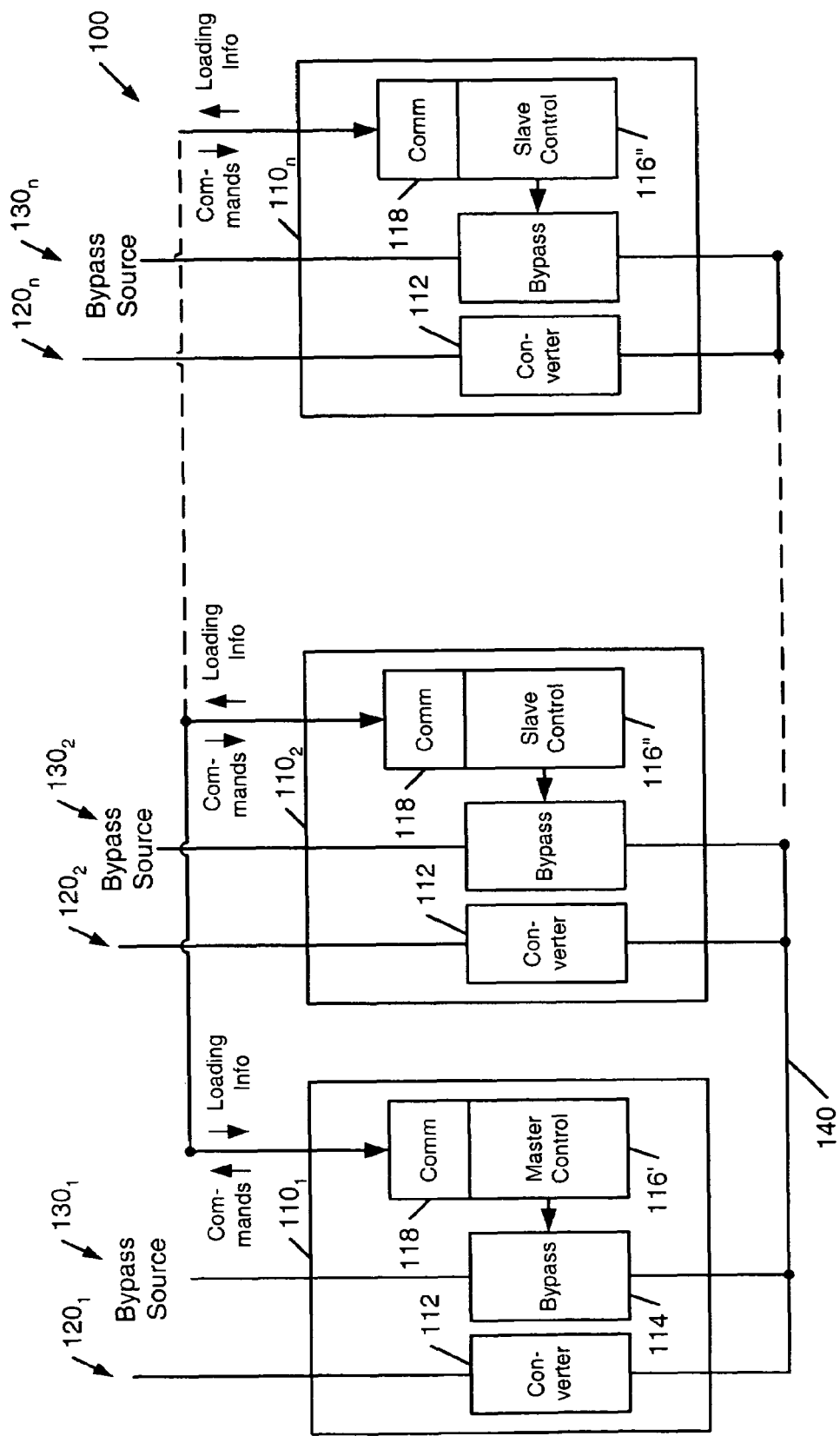
FIGS. 1 and 4 are schematic diagrams illustrating a parallel connected UPS configurations and operations according to various embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items. Like numbers refer to like elements throughout.

Embodiments of the invention include circuitry configured to provide functions described herein. It will be appreciated that such circuitry may include analog circuits, digital circuits, and combinations of analog and digital circuits.

The invention is described below with reference to block diagrams and/or operational illustrations of methods and wireless terminals according to embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Computer program code for carrying out operations of the invention may be written in an object oriented programming language such as Java®, Smalltalk or C++, conventional procedural programming languages, such as the "C" programming language, or lower-level code, such as assembly language and/or microcode. The program code may execute entirely on a single processor and/or across multiple processors, as a stand-alone software package or as part of another software package.

FIG. 1 illustrates a power conversion apparatus 100 according to some embodiments of the invention. The apparatus 100 includes a plurality of UPSs $110_1, 110_2, \ldots, 110_n$ connected in parallel to a load bus. Each UPS $110_1, 110_2, \ldots, 110_n$ includes a power converter circuit 112 that receives power from a converter source $120_1, 120_2, \ldots, 120_n$ and a bypass circuit (e.g., a static switch or other switching circuit) 114 that receives power from a bypass source $130_1, 130_2, \ldots, 130_n$. The converter sources $120_1, 120_2, \ldots, 120_n$ and the bypass sources $130_1, 130_2, \ldots, 130_n$ are shown as being separate to indicate that power may be provided to the converter circuits 112 and the bypass circuits 114 over separate paths, e.g., via separate conductors, switches, relays, breakers, and the like, even though the converter sources $120_1, 120_2, \ldots, 120_n$ and the bypass sources $130_1, 130_2, \ldots, 130_n$ are ultimately fed from a common AC power source, e.g., a utility source. It will, therefore, be understood that a "bypass source" as described herein may include this common AC power source and/or a path component, e.g., a line, breaker, switch, relay or the like, that feeds the bypass circuit 114, and that failure of such a bypass source may include failure of the common AC power source and/or a failure arising from a state of component in a path feeding the bypass circuit 114.

The respective bypass circuits 114 are controlled by respective control circuits, here shown as including a master control circuit 116' in a first UPS $110_1$ and slave control circuits 116" in the other UPSs $110_2, \ldots, 110_n$. The control circuits 116', 116" are operatively associated with communications circuits (e.g., controller area network (CAN) transceivers) 118 that are operative to communicate loading info (e.g., current measurements) and control commands.

Figure 2:
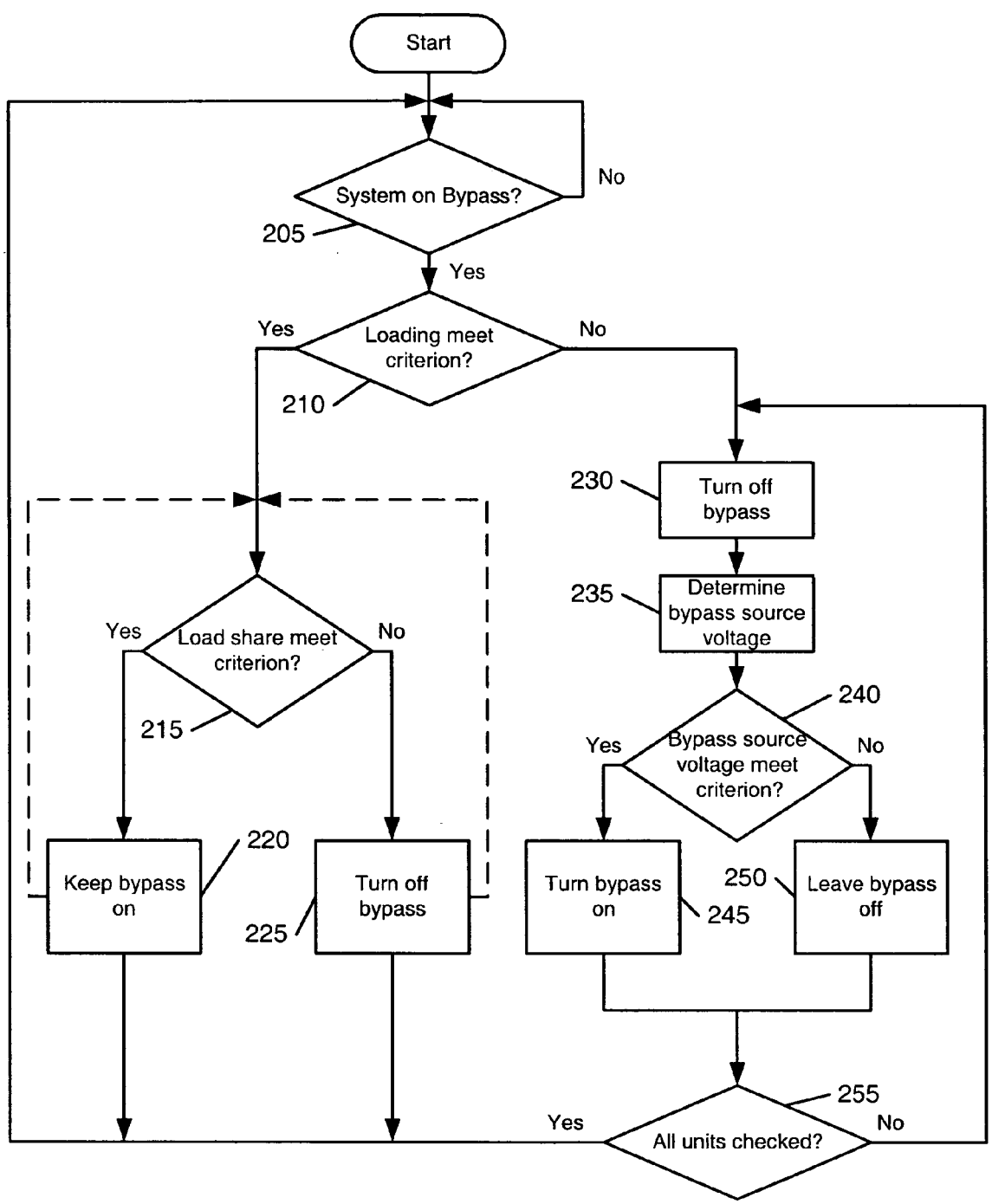
FIGS. 2 is a flowchart illustrating exemplary operations of the apparatus of FIGS. 1 and 4 according to some embodiments of the invention.

FIG. 2 illustrates exemplary operations that may be performed by the apparatus 100 according to some embodiments of the invention. Responsive to a determination that the apparatus 100 is in a bypass mode (Block 205), the apparatus 100 determines if a loading of the UPSs $110_1, 110_2, \ldots, 110_n$ meets a predetermined criterion (Block 210). For example, the apparatus 100 may determine an aggregate loading of the UPSs $110_1, 110_2, \ldots, 110_n$ at the load bus 140 from individual loading (e.g., current) measurements made by each of the UPSs $110_1, 110_2, \ldots, 110_n$ and communicated by the communications circuits 118, and may determine if the aggregate loading is greater than a predetermined threshold value. In some embodiments, the predetermined threshold value may be a value, for example, that corresponds to a loading level above which it may be accurately determined, using the load share measurements described below, which UPSs are supplying the load bus 140. The threshold value could also represent a loading level above which it is not feasible to disconnect a load-sharing UPS from the load bus 140 for the bypass voltage testing described below without overloading the remaining UPSs supplying power to the load bus 140.

If the loading meets the predetermined criterion, load shares of the individual UPSs $110_1, 110_2, \ldots, 110_n$ may be evaluated to determine whether they meet a predetermined criterion (Block 215). For example, if n equivalent UPSs are connected in parallel, failure of a particular UPS's bypass source with respect to the load share criterion may be detected by detecting that the UPS's load share is significantly less than 1/n times the aggregate loading. If the load share of a particular UPS fails to meet the predetermined criterion, for example, is less than a predetermined proportion of the aggregate loading, the bypass circuit 114 of the UPS is turned off (Block 225) so that voltage on the load bus 140 does not backfeed through the UPS's bypass circuit. If the load share meets the predetermined criterion, however, the UPS's bypass circuit 114 is kept on (Block 220). It will be appreciated that the load share determination of the individual UPS's and/or control of their respective bypass circuits 114 may be done in a parallel or quasi-parallel manner, e.g., concurrently, or may be done in a serial fashion, as indicated by the dashed arrows.

If the aggregate loading fails to meet the predetermined criterion (e.g., is less than a predetermined threshold value), individual bypass source voltage tests are performed on the UPSs. In particular, a bypass circuit 114 of a first UPS is turned off (Block 230) to decouple its bypass source from the load bus 140. The bypass source voltage may then be determined (Block 235), e.g., by measuring the voltage at an input of the bypass circuit 114. If the bypass source voltage fails to meet a predetermined criterion (e.g., is less than a predetermined threshold value), indicating a failure of the bypass source, the UPS's bypass circuit 114 is left off to prevent voltage backfeed (Blocks 240, 250). If the bypass source voltage meets the predetermined criterion (e.g., is greater than the predetermined threshold value), the bypass circuit 114 is turned on (Blocks 240, 245). Upon completion of these steps, a next UPS may be evaluated (Block 255). It will be appreciated that bypass source voltage testing of the individual UPSs may also be done in a quasi-parallel manner, i.e., multiple units may be tested concurrently while leaving the bypass circuits of one or more units on to maintain the load. It will be appreciated that a variety of loading and voltage criteria may be used for the operations described above. For example, average loading, min-max loading, or other loading criteria may be used instead of or in conjunction with an aggregate loading criterion.

Figure 3:
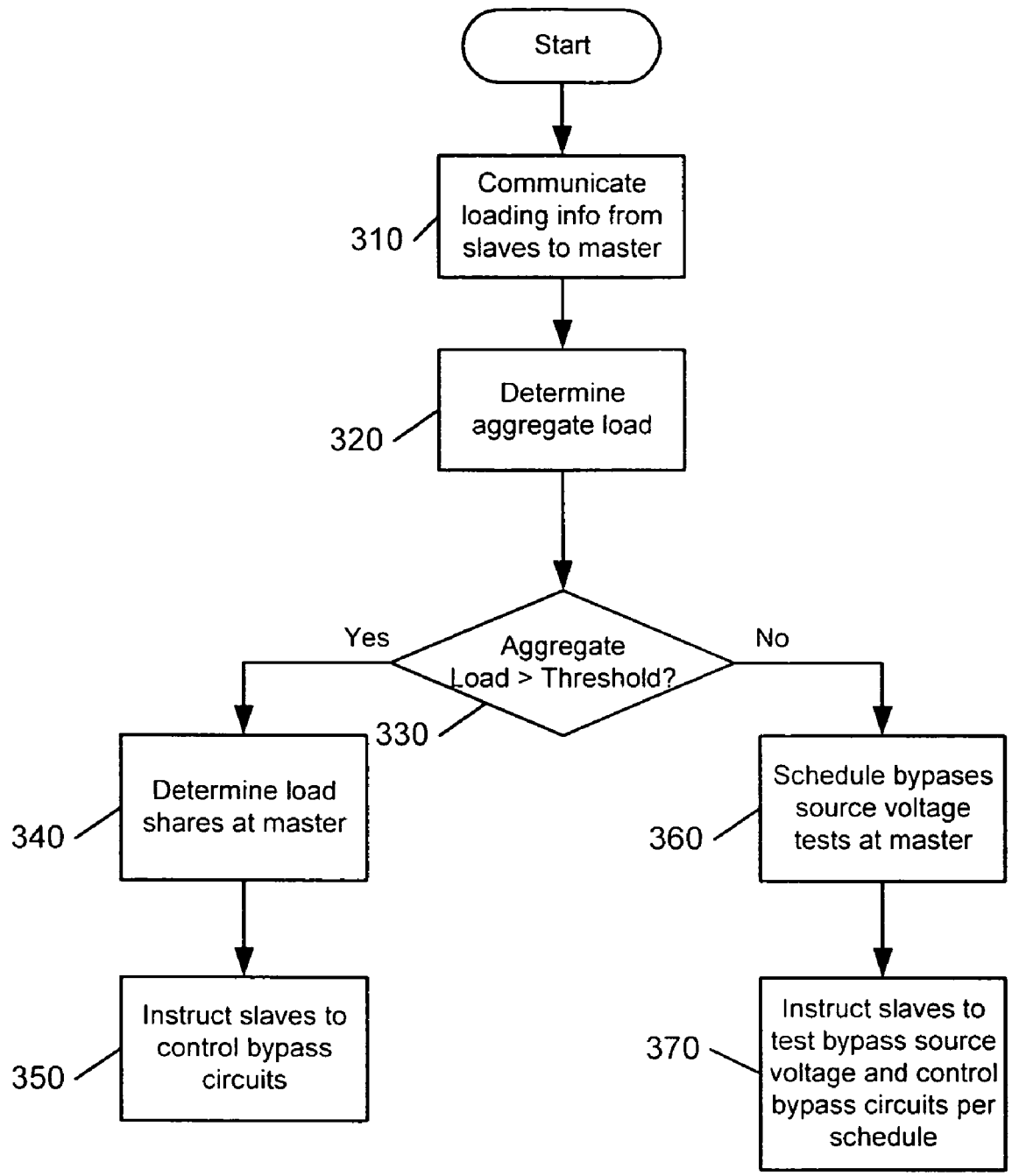
FIG. 3 is a flowchart illustrating exemplary operations in a master/slave control configuration of FIG. 1 according to some embodiments of the invention.

FIG. 3 illustrates exemplary allocation of tasks along the lines illustrated in FIG. 2 in a master/slave control configuration such as that illustrated in FIG. 1. The slave control circuits 116″ communicate loading information (e.g., current measurements) to the master control circuit 116′ (Block 310). The master control circuit 116′ then determines the aggregate loading of the UPSs 110$_1$, 110$_2$, ..., 110$_n$ (Block 320). If the aggregate loading is less than a predetermined threshold value, the master control circuit 116′ determines the individual load shares of the UPSs 110$_1$, 110$_2$, ..., 110$_n$ (Blocks 330, 350). The master control circuit 116′ then instructs the slave control circuits 116″ to control their bypass circuits 114 accordingly (Block 350). Alternatively, the master control circuit 116′ could communicate the aggregate loading information to the other control circuits 116″, which could, in turn, compute their own load shares and control their bypass circuits 114 accordingly.

If the aggregate loading is less than the predetermined threshold value, the master control circuit 116′ schedules bypass source voltage tests for the UPSs 110$_1$, 110$_2$, ..., 110$_n$ (Blocks 330, 360). The master control circuit 116′ then instructs the slave control circuits 116″ to determine their respective bypass source voltages and to control their bypass circuits 114 accordingly (Block 370). These operations may occur in a number of different ways. For example, the slave control circuits 116″ could relay bypass source voltage measurements back to the master control circuit 116′, which could, in turn, responsively command the slave control circuits 116″ to place their bypass circuits 114 in appropriate states. Alternatively, each of the slave control circuits 116″ may independently test its bypass source voltage and responsively control its bypass circuit 114 responsive to a scheduling command from the master control circuit 116′.

Figure 4:
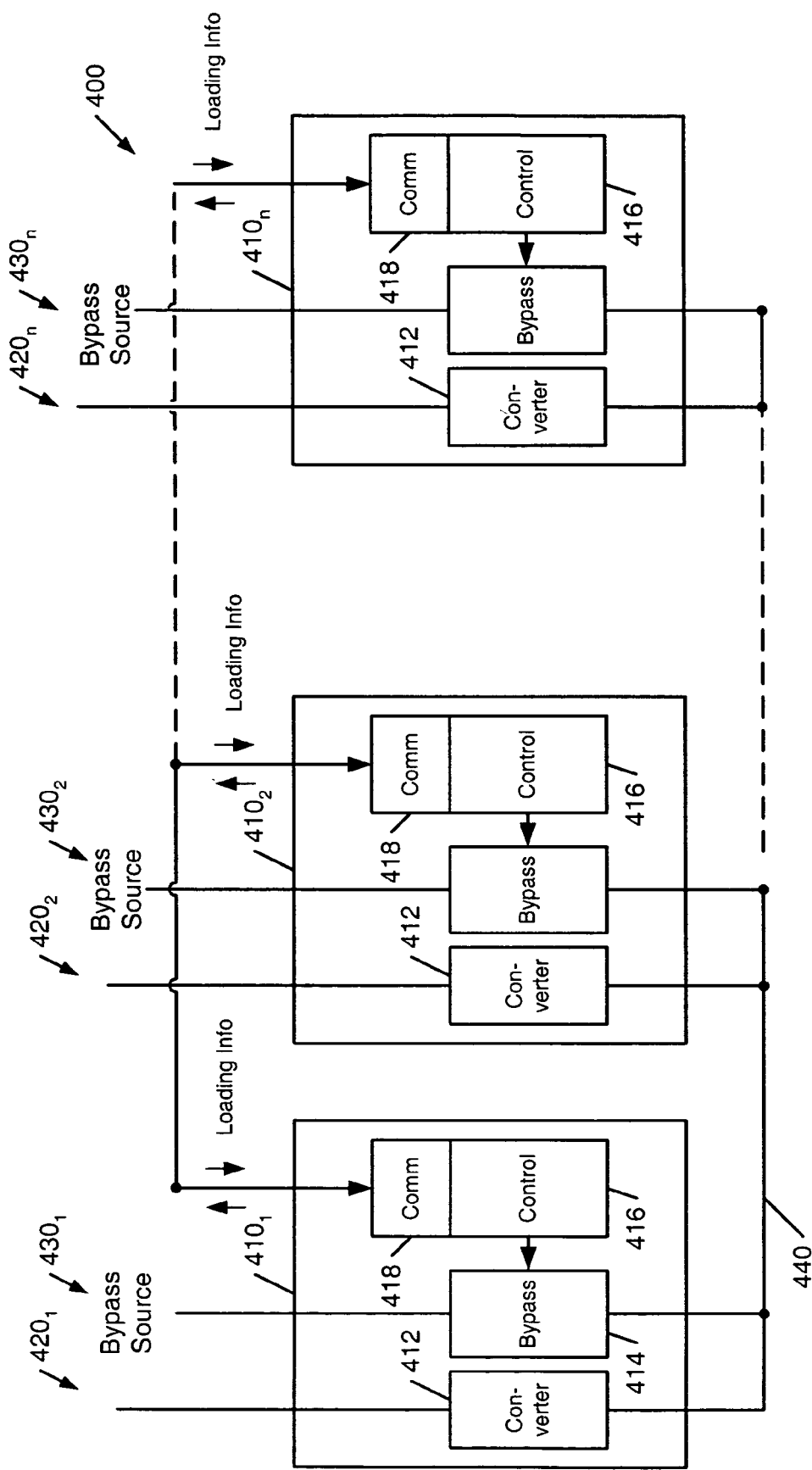

FIG. 4 illustrates a power conversion apparatus 400 according to further embodiments of the invention. The apparatus 400 includes a plurality of UPSs 410$_1$, 410$_2$, ..., 410$_n$ connected in parallel to a load bus 440. Each UPS 410$_1$, 410$_2$, ..., 410$_n$ includes a power converter 412 that receives power from a primary source 420$_1$, 420$_2$, ..., 420$_n$ and a bypass circuit (e.g., a static switch) 414 that receives power from a bypass source 430$_1$, 430$_2$, ..., 430$_n$. The respective bypass circuits 414 are controlled by respective peer control circuits 416. The peer control circuits 416 are operatively associated with respective communications circuits (e.g., controller area network (CAN) transceivers) 418 that are operative to communicate loading info (e.g., current measurements) therebetween. The apparatus 400 may be configured to provide bypass source monitoring and bypass circuit control operations along the lines described above with reference to FIG. 2.

Figure 5:
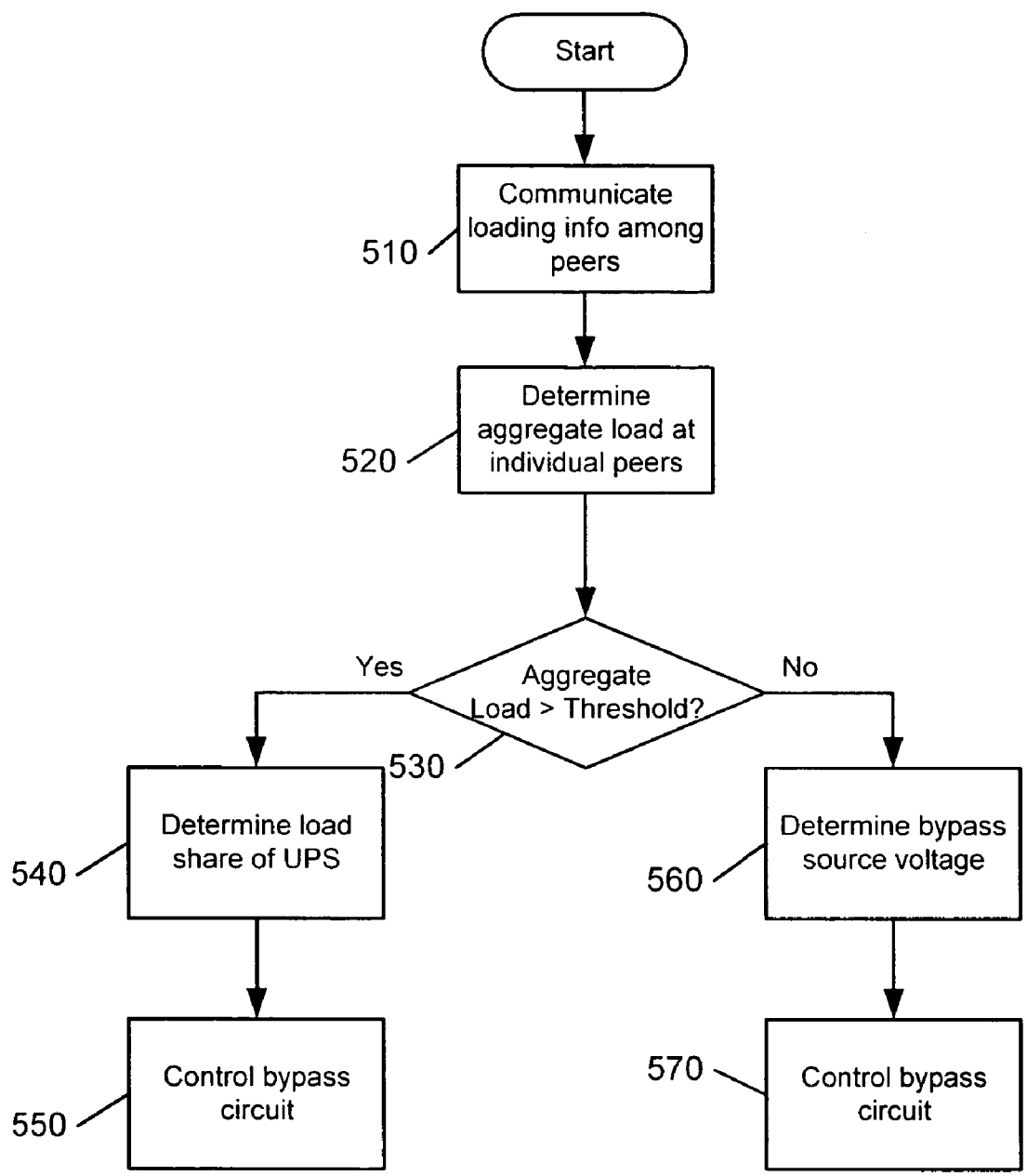
FIG. 5 is a flowchart illustrating exemplary operations in a peer/peer control configuration of FIG. 4 according to some embodiments of the invention

FIG. 5 illustrates exemplary allocation of tasks among the peer control circuits 416 according to further embodiments of the invention. The control circuits 416 communicate loading info among themselves via the communications circuits 418 (Block 510). Each control circuit 416 determines an aggregate loading of the apparatus 400 from the communicated information (Block 520). At an individual peer, if the determined aggregate loading is greater than a predetermined threshold, the control circuit determines a load share of the UPS and controls its bypass circuit accordingly (Blocks 530, 540, 550). If the determined aggregate loading is less than the predetermined threshold, the control circuit may determine its bypass source voltage (e.g., by opening its bypass circuit and measuring the bypass circuit input voltage), and control its bypass circuit accordingly (Blocks 570). It will be appreciated that the bypass source voltage tests may occur according to some predetermined schedule or order, such that sufficient power supply to the load is maintained.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a power conversion apparatus including a plurality of parallel-connected uninterruptible power supplies (UPSs), the method comprising:
   determining a status of a bypass source of the plurality of parallel-connected UPSs based on a magnitude of a load share of a UPS of the plurality of UPSs when an aggregate loading of the plurality of parallel-connected UPSs meets a predetermined criterion, wherein determining a status of a bypass source of the plurality of parallel-connected UPSs based on a magnitude of a load share of a UPS of the plurality of UPSs when an aggregate loading of the plurality of parallel-connected UPSs meets a predetermined criterion comprises identifying failure of a bypass source of a UPS responsive to detecting that a magnitude of a load share of the UPS is less than a predetermined proportion of the aggregate loading; and
   determining a status of a bypass source of the plurality of parallel-connected UPSs based on a bypass source voltage when the loading of the plurality of parallel-connected UPSs fails to meet the predetermined criterion.

2. A method according to claim 1, further comprising decoupling the bypass source of the UPS from an output of the UPS responsive to identifying failure of the bypass source.

3. A method according to claim 1, further comprising controlling bypass circuits of the UPSs responsive to load share and/or bypass source voltage.

4. A method of operating a power conversion apparatus including a plurality of parallel-connected uninterruptible power supplies (UPSs), the method comprising:
   determining a status of a bypass source of the plurality of parallel-connected UPSs based on a magnitude of a load share of a UPS of the plurality of UPSs when a loading of the plurality of parallel-connected UPSs meets a predetermined criterion;
   determining a status of a bypass source of the plurality of parallel-connected UPSs based on a bypass source voltage when the loading of the plurality of parallel-connected UPSs fails to meet the predetermined criterion, wherein determining a status of a bypass source of the plurality of parallel-connected UPSs based on a bypass source voltage when the loading of the plurality of parallel-connected UPSs fails to meet the predetermined criterion comprises:
      decoupling a bypass source of a UPS from an output of the UPS;
      determining a bypass source voltage of the decoupled bypass source; and
      identifying failure of the bypass source responsive to detecting that the determined bypass voltage fails to meet a predetermined criterion; and
   decoupling the bypass source from an output of the UPS responsive to identifying failure of the bypass source.

5. A method of operating a power conversion apparatus including a plurality of parallel-connected uninterruptible power supplies (UPSs) having outputs coupled in common to load bus, the method comprising:

determining an aggregate loading of the plurality of parallel-connected UPSs at the load bus, wherein determining an aggregate loading comprises determining a total current supplied by the plurality of parallel-connected UPSs;

selectively determining one of a magnitude of a load share provided by a first UPS of the plurality of parallel-connected UPSs or a bypass source voltage for the first UPS responsive to the determined aggregate loading, wherein selectively determining one of a magnitude of a load share provided by a first UPS or a bypass source voltage for the first UPS responsive to the determined aggregate loading comprises determining the magnitude of the load share provided by the first UPS if the determined aggregate loading exceeds a predetermined threshold, and wherein determining the magnitude of a load share for the first UPS comprises determining a current provided by the first UPS; and controlling a bypass circuit of the first UPS responsive to the selectively determined magnitude of the load share or bypass source voltage for the first UPS, wherein controlling a bypass circuit of the first UPS responsive to the selectively determined magnitude of a load share or bypass source voltage for the first UPS comprises controlling the bypass circuit responsive to the determined magnitude of the load share for the first UPS.

6. A method according to claim 5, wherein controlling a bypass circuit of the first UPS responsive to the selectively determined magnitude of a load share or bypass source voltage is followed by:

determining a magnitude of a load share of a second UPS of the plurality of parallel-connected UPSs; and controlling a bypass circuit of the second UPS responsive to the determined magnitude of a load share of the second UPS.

7. A method according to claim 5:

wherein selectively determining one of a magnitude of a load share provided by a first UPS or a bypass source voltage for the first UPS responsive to the determined aggregate loading comprises determining respective magnitudes of load shares of multiple ones of the plurality of parallel-connected UPSs if the determined aggregate loading exceeds a predetermined threshold; and wherein controlling a bypass circuit of the first UPS responsive to the selectively determined magnitude of a load share or bypass source voltage comprises concurrently controlling bypass circuits of the multiple ones of the plurality of parallel-connected UPSs responsive to the respective determined magnitudes of load shares.

8. A method according to claim 5:

wherein selectively determining one of a magnitude of a load share provided by a first UPS of the plurality of parallel-connected UPSs or a bypass source voltage for the first UPS responsive to the determined aggregate loading comprises:

decoupling a bypass source for the first UPS from the load bus if the determined aggregate loading is less than a predetermined threshold; and determining the bypass source voltage for the decoupled bypass source; and wherein controlling a bypass circuit of the first UPS responsive to the selectively determined magnitude of a load share or bypass source voltage comprises controlling the bypass circuit of the first UPS responsive to the determined bypass source voltage.

9. A method according to claim 8, wherein controlling the bypass circuit of the first UPS responsive to the determined bypass source voltage is followed by:

decoupling a bypass source for a second UPS of the plurality of parallel-connected UPSs from the load bus;

determining a bypass source voltage for the decoupled bypass source for the second UPS; and controlling a bypass circuit for the second UPS responsive to the determined bypass source voltage for the second UPS.

10. A power conversion apparatus comprising:

a plurality of parallel-connected UPSs; and a control circuit operative to determine a status of a bypass source of the plurality of parallel-connected UPSs based on a magnitude of a load share when an aggregate loading of the plurality of parallel-connected UPSs meets a predetermined criterion and to determine a status of a bypass source of the plurality of parallel-connected UPSs based on a bypass source voltage when the aggregate loading of the plurality of parallel-connected UPSs fails to meet the predetermined criterion, wherein the control circuit is operative to identify failure of a bypass source of a UPS responsive to detecting that a magnitude of a load share of the UPS is less than a predetermined proportion of the aggregate loading.

11. An apparatus according to claim 10, wherein the control circuit is further operative to decouple the bypass source of the UPS from an output of the UPS responsive to identifying failure of the bypass source.

12. An apparatus according to claim 10, wherein the control circuit is operative to decouple a bypass source of a UPS from an output of the UPS, to determine a bypass source voltage of the decoupled bypass source, and to identify failure of the bypass source responsive to detecting that the determined bypass voltage fails to meet a predetermined criterion.

13. An apparatus according to claim 10, wherein the control circuit is further operative to control a bypass circuit of the UPSs responsive to a load share and/or a bypass source voltage.

14. An apparatus according to claim 10, wherein the control circuit comprises a plurality of control circuits positioned in respective ones of the plurality of parallel-connected UPSs.

15. An apparatus according to claim 14, wherein the plurality of control circuits comprises at least one master control circuit and at least one slave control circuit.

16. An apparatus according to claim 14, wherein the plurality of control circuits comprises a plurality of peer control circuits.

17. A UPS, comprising:

a power conversion circuit operative to transfer power to a load bus;

a bypass circuit operative to couple and decouple a bypass source to and from the load bus;

a communications circuit operative to communicate with at least one other UPS; and a control circuit operatively associated with the communications circuit and the bypass circuit and operative to determine a loading of the UPS, to selectively determine a magnitude of a load share of the UPS or a bypass source voltage of the bypass source responsive to the determined aggregate loading, and to control the bypass circuit responsive to the selectively determined magnitude of the load share or bypass source voltage, wherein the control circuit is further operative to control a bypass circuit of the at least one other UPS and wherein the control circuit is operative to schedule a bypass voltage test of the at least one other UPS responsive to the determined loading.

18. A UPS according to claim 17, wherein the control circuit is operative to determined an aggregate loading of the UPS and the at least one other UPS and to inform the at least one other UPS of the determined aggregate loading via the communications circuit.

* * * * *